United States Patent [19]

Stanley et al.

[11] 3,761,697

[45] Sept. 25, 1973

[54] DATA PROCESSOR INTERFACE

[75] Inventors: Kenneth Stanley Darton, Harlow; Geoffrey Allen Hunt, Old Harlow; David William Wright, Harlow, all of England

[73] Assignee: International Standard Electric Corporation, New York, N.Y.

[22] Filed: Nov. 17, 1971

[21] Appl. No.: 199,690

[52] U.S. Cl. .............................. 235/154, 340/172.5
[51] Int. Cl. .......................... G06f 5/04, G06f 15/00
[58] Field of Search .................. 235/154; 340/172.5; 325/38 R; 178/2, 3, 17

[56] References Cited

UNITED STATES PATENTS

| | | | |
|---|---|---|---|
| 3,321,609 | 5/1967 | Bonney et al. | 235/154 |
| 3,376,550 | 4/1968 | Wong et al. | 235/154 |
| 3,466,432 | 9/1969 | Adams et al. | 235/154 |

*Primary Examiner*—Maynard R. Wilbur
*Assistant Examiner*—Leo H. Boudreau
*Attorney*—C. Cornell Remsen, Jr. et al.

[57] ABSTRACT

An interface is coupled between a 20-bit serial word signalling stem and a 16-bit parallel word data processor. The interface buffers the transmission to an from the line, transfers to and from the processor in pairs of 10-bit half-words, and performs all repetitive functions to limit utilization of the processor.

4 Claims, 4 Drawing Figures

Inventors
KENNETH S. DARTON
GEOFFREY A. HUNT
DAVID W. WRIGHT
By [signature]
Attorney Inventors
KENNETH S. DARTON
GEOFFREY A. HUNT
DAVID W. WRIGHT
By [signature]
Attorney

PATENTED SEP 25 1973 3,761,697

SHEET 3 OF 4

Inventors
KENNETH S. DARTON
GEOFFREY A. HUNT
DAVID W. WRIGHT
By [signature]
Attorney Inventors
KENNETH S. DARTON
GEOFFREY A. HUNT
DAVID W. WRIGHT
By [signature]
Attorney

DATA PROCESSOR INTERFACE

BACKGROUND OF THE INVENTION

This invention relates to a data processor interface for connecting a digital data processor to a digital data transmission means where the processor and the transmission means employ different length data words. For example, a transmission system may be required to interconnect a number of different types of computer. It is convenient for the system always to use the same length words and therefore interfaces will be required at the terminals where the different computers connect to the system.

A particular application for the invention lies in the telephone signalling field. The proposed CCITT No. 6 signalling system has terminals under processor control. It is necessary for the No. 6 system to be able to make use of processors produced by different manufacturers and designed according to the specifications produced by different national administrations.

The present systems of signalling on international telephone networks are becoming inadequate for present and future needs, due both to slow speed and lack of versatility. The CCITT No. 6 system is intended to overcome these problems, and also be more economical and error-free.

The No. 6 system will utilize data transmission at 2,400 bauds over a separate circuit, independent of the speech circuits. Check bits will be included for error detection — correction will be by retransmission.

Twenty bits of data, with 6, 7 or 8 check bits, will form one Signal Unit (SU). Alterations to deal with 6 or 7 check bits are very simple. One Signal Unit of 28 bits has a transmission time of 11.7 mS.

Twelve Signal units are grouped together to form a Block. The last SU in the block, called an Acknowledgement Unit (ACU), informs the distant terminal which, if any, SU's in the last block received contain errors, and must be retransmitted. If an ACU is received incorrectly, the whole block is retransmitted.

The other SU's in the block may be either data, or Synchronization Units (SYU) which are sent to keep the system in synchronization when no data is ready. It has been estimated that even in a 500 circuit system, (the maximum possible if queueing delays at busy times are not to be excessive), the average data occupancy will be less than 50 percent.

The SYU's are also used to regain synchronization in the event of a fault occurring, as indicated by an excessive error rate.

A No. 6 terminal will be under processor control from a time sharing digital computer which may also be used to control an international exchange.

One type is a 16-bit computer intended mainly for on-line application such as the control of a small to medium size telephone exchange.

In such a computer, the memory cycle time is 1$\mu$S, and memory size can range from 8K to 65K words. The instruction set includes instructions for bit and slice manipulation.

The interrupt facilities allow up to 16 priority levels, some of which may be sub-divided into 16 sub-levels; any level or sub-level may be inhibited by program, thus variable priority working is possible.

Besides the normal direct interface for peripherals, a number of channels may be connected, which allow transfer of data to and from the memory by "cycle stealing", independent of the current program. A "main frame" (i.e. CPU) interrupt may be caused when a specified amount of data has been transferred.

The interface is the point at which the processor or computer is connected to peripherals, et cetera.

Each peripheral must be controlled by a device controller. It is this which is actually connected to the interface. One device controller may control several peripherals, and may communicate via either the direct interface, (i.e. through the main frame), or via a channel, or both.

It is expected that a No. 6 device controlled will control more than one circuit. The input and output sections will be independent, so as to minimize the effects of a fault.

The device controller for the No. 6 system will take a serial bit stream from a 2,400 baud modem, and deliver the data, one SU at a time, to the processor. It will also accept data from the processor and send it, as a bit stream, to the modem.

Because computer time is expensive, and the computer will probably be controlling an international exchange as well as processing No. 6 data, it is important to keep the workload of the computer to a minimum. For this reason, both coding and decoding of the check bits are performed in the device controller. In addition, the device controller will produce the Test Unit signal without data being transferred, and recognize it when received. The device controller must also be able to synchronize itself at SU rate since if the computer were to control this it would need to be interrupted at bit rate (416$\mu$S) while resynchronizing.

At first sight, the use of a channel for data transfer seems attractive, especially if several SU's could be transferred to memory before causing an interrupt, thus reducing the necessary priority of the interrupt. However, the delay permissible at a No. 6 terminal is not sufficient to allow more than one SU to be stored. Also, each terminal is likely to have four to six No. 6 signal circuits. This many channels would be excessively expensive, and multiplexing into one channel would not be possible, as a failure in the multiplexer would disable all the circuits.

Thus the direct interface is used. It is possible to store received data for the length of one SU (11.7 mS for 8 check bits, 10.8 mS if there are 6). Transfer must take place as two separate words, as there are 20 bits of data, and the indicated computer type has 16-bit words.

SUMMARY OF THE INVENTION

An object of this invention is to provide a data processor interface for connecting a digital data processor to a digital data transmission means where the processor and the transmission means employ different length data words.

According to the invention there is provided a data processor interface for connecting a digital data processor utilizing data words of $n$ - bits with a digital data transmission means in which data is transmitted in words of $m$ - bits, where $m > n$ but $\leq 2n$, the $m$ - bits which make up a transmission word including $k$ check bits, where $k \leq n$, including an $m$ - bit register in which data may be received from and an $m$ - bit register from which data may be transmitted to the transmission means in serial form, an $m$ - bit buffer store to which an $m$ - bit data word in the register may be transferred in parallel or from which an $m$ - bit data word may be transferred in parallel to the register, a $k$ - bit check register in which check bits relevant to an $m$ - bit data word in the $m$ - bit register are generated, means for comparing the output of the $k$ - bit check register with the check bits contained in an $m$ - bit word received from the transmission means, means for inserting the output of the $k$ - bit check register in an $m$ - bit data word being serially transferred from the $m$ - bit register to the transmission means, and means for transferring in parallel two $n$ - bit data words sequentially to the buffer store from the processor and from the buffer store to the processor for each $m$ - bit word stored in the buffer store, each pair of $n$ - bit words having together $2n$-$m$ digit positions not occupied by data bits or occupied by bits not forming part of the $m$ - bit data word.

BRIEF DESCRIPTION OF THE DRAWINGS

The invention will be better understood by a description of an embodiment thereof taken in conjunction with the accompanying drawings, in which.

Figure 1:
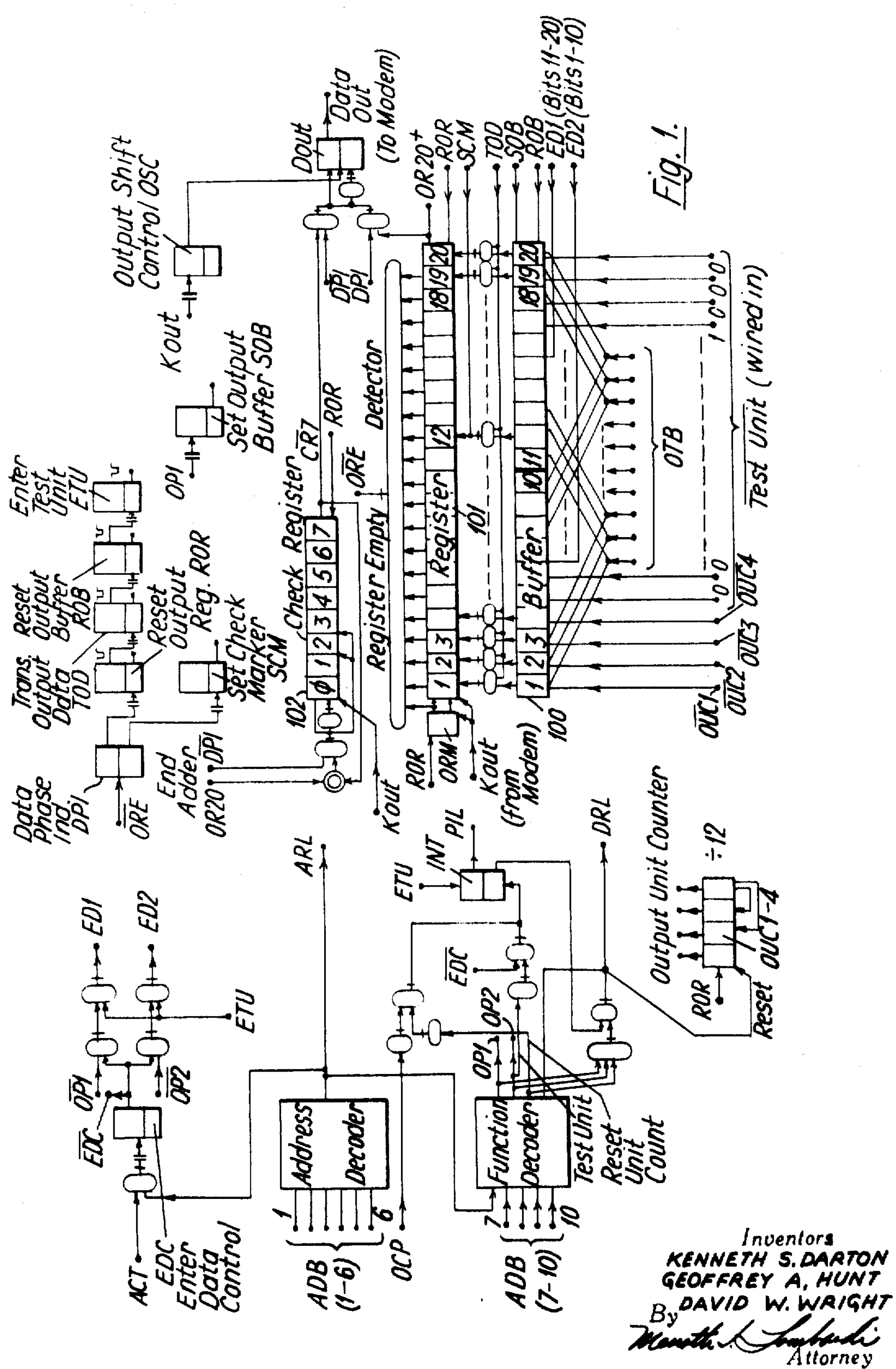
FIG. 1 illustrates the output from a data processor to a data modem terminating a transmission line and FIG. 1$a$ shows a timing diagram having relevance to the arrangement of FIG. 1.

In the drawings the following references are used.

ADB — A 10-line address bus.

Six bits of this give the device controller address. Four bits tell the specified controller what function to perform. Generally input functions use codes 1000 to 1111 and output functions codes 0000 to 0111.

ARL — Address recognized line to a main from (CPU), set by the device controller when it has recognized its own address.

DRL — Device ready line to CPU, indicates that the function specified can be performed.

OTB — Data out of the device controller.

Sixteen lines which are set at least 100 ns prior to the act pulse and which must be true for the duration of that pulse.

DOUT — Data out to modem.

INB — Data in from the device controller.

Sixteen lines which are set true by the device controller prior to the DRL and stay true until the end of the act pulse.

DIN — Data in from modem.

ACT — Act pulse line.

On outward transfer this is set by CPU when the DRL has been received and the data lines have been set. On inward transfer it indicates that the data has been received.

OCP — Escape line to the device controller.

A pulse on this line can be sent in place of the ACT pulse when an order not involving data transfer is sent to the device controller.

PIL — Interrupt line set by the device controller when it wishes to cause an interrupt.

MSK — Sixteen lines to CPU used for setting up masks (in conjunction with OCP and OTB lines) to control interrupt priorities.

CLR — Clear line to the device controller set by CPU.

DESCRIPTION OF THE PREFERRED EMBODIMENT

The output section, FIG. 1, of the device controller must accept 16-bit data words from the processor, add the check bits and transmit the data in serial form to the modem. If no data is ready it must send a test unit.

Part of the test unit consists of a 4-bit number indicating the position in the block, so a modulo-12 4-bit counter must be included. As block synchronism is controlled by the processor, the counter must be reset by the processor after each ACU (always sent in position 12), so that the software unit count and device controller count are always in step. For the same reason, the processor must respond to an interrupt even if no data is ready; the only action to be taken would be to increment the unit count and send a signal which clears the interrupt.

The data from the processor is loaded into a buffer 100 via OTB. The buffer contents are transferred in parallel to a shift register 101 when that becomes empty. The data in the register is then shifted along, forming a serial data stream at the last stage for transfer to the modem. As soon as the buffer contents are transferred, an interrupt is sent to the processor. This must be dealt with within 11.7 mS, causing either new data or a SYU to be loaded into the buffer 100.

The check bits are formed in a re-entrant shift register 102, which has feedback to three half-adders. The data transmitted is fed in to the check register 102. When the 20 bits have been sent, the check bits have been formed, and are inverted and shifted out to the line. The inversion is necessary, as the check bits for all zeros are also zero, and without the inversion, a line break causing the modem to produce continuous zeros would be treated by the error detection circuit as a correct "all zeros" message.

Figure 1A:
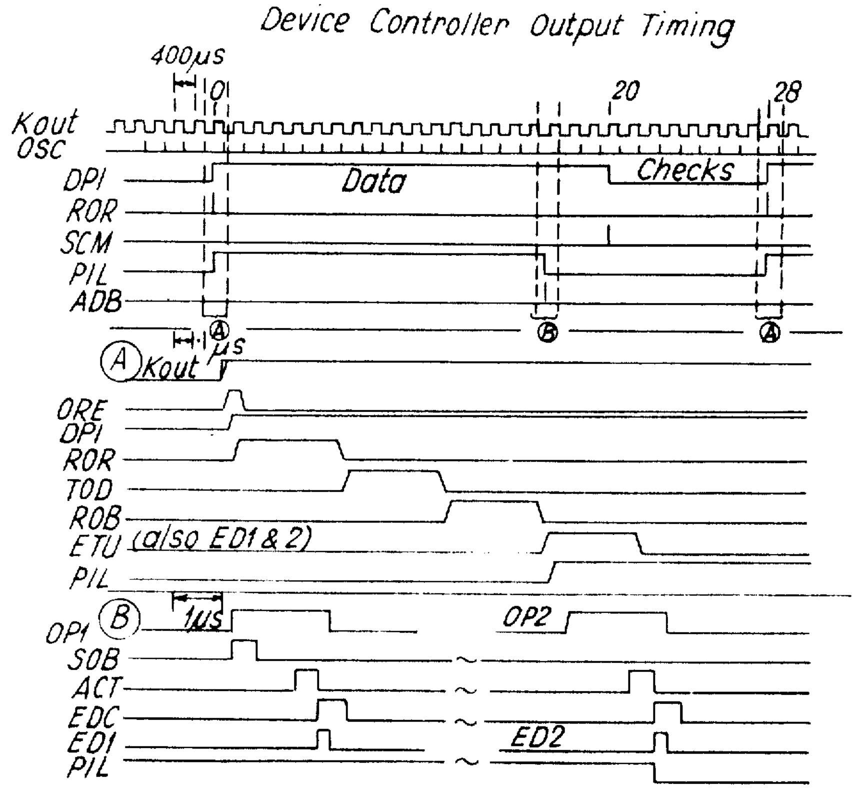

The operation of the output mode will now be further described with reference to the timing diagram shown in FIG. 1a. KOUT is a 400 $\mu$s clock in the modem.

Assume that the last check bit has just been set in DOUT. As this bistable is clocked on the falling clock edge, nothing else happens at this time.

On the next clock rising edge, the Check Marker is shifted out of the Output Register. $\overline{ORE}$ (register empty) goes to 1, which switches over the data phase indicator DPI to 1 (data phase). This fires the register reset monostable ROR, connects register 101 to DOUT, and connects the check register input.

The ROR pulse steps the Unit Counter, and resets the register. The output register marker ORM is set This causes $\overline{ORE}$ to drop back to zero, as not all its inputs are at 0.

At the end of the ROR pulse, the transfer output data monostable TOD fires. This opens the gates from the buffer 100, so setting up the next Signal Unit in the register 101. This means that the next output shift control pulse OSC, on the negative clock edge, will set up the first bit of the new SU on the output line.

Meanwhile, the falling edge of TOD fires the reset buffer monostable ROB, which resets the buffer 100.

At the end of ROB, the enter test unit monostable ETU fires. This sets the interrupt. It also sets ED1 and ED2, the clock signals for the buffer 100. This causes the SYU to be set up in the buffer. It is possible that there is a signal on the OTB lines at this instant, but this will not cause errors. If, for example, a bistable is to be set to 1, the K input is set to 0. If the J input is at 1, the output will be set to 1 after the clock pulse. If the J input is at 0, the bistable will change to opposite state, which is still the desired 1.

Similarly if the K input is set to 1, the output is either set to 0, (which it already is), or stays the same. Thus signals on the data line have no effect on the buffer.

At some time within 11.7 mS the processor will respond to the interrupt (PIL). If there is no data ready for transmission, it will send a "SYU" function code. This will simply reset the interrupt. The SYU has already been loaded into the buffer, so it will be transferred to the register when the data currently there has been sent.

If data (or an ACU) is to be sent, the processor will first send an OP1 function code. This fires the set output buffer monostable SOB, which sets the buffer to all 1's. At the end of the ACT pulse, the enter data control monostable EDC fires, and is gated with OP1 to give the ED1 pulse. This clocks in the data on the OTB to the right-hand half of the buffer. As this was set to 1 by the SOB, only data on the J inputs is significant, and the SYU inputs have no effect.

A few $\mu$S later, the processor will send OP2. This time the EDC is gated with OP2 and directs the OTB to the left-hand half of the buffer. It also resets the interrupt.

The use of the EDC ensures that the OTB is strobed at the end of the ACT pulse. This is probably not necessary, and the ACT pulse itself could be used. However, this would result in the PIL and the DRL going to 0 at the beginning of the ACT pulse, unless the EDC were still used to reset PIL.

If the information sent is an ACU, the processor will also send a "Reset Unit Count" code, to reset the unit counter to its correct value. It will normally be at this value, but a facility for resetting must be available for start-up, and in case the counter should get out of step due, e.g. to the processor not responding to an interrupt and so losing count of the number SYU's sent. Possibly the R.U.C. code would only be sent when starting, or when the last ACU transmitted had not been acknowledged.

When the 20 data bits have been shifted out of the register 101, the marker will be in OR20, and $\overline{\text{ORE}}$ will go to 1. This will switch over DPI, which will connect the output of the check register to DOUT, disconnect OR20 from its input, and fire the set check marker monostable SCM. This puts the check marker in OR12.

The next eight clock cycles shift the check bits to the output stage DOUT. At this point, the check marker will have reached OR20, and $\overline{\text{ORE}}$ will come up again. This will switch DPI over to 'Data', which is where we started.

The response to the interrupt may come during either data or check phases.

Figure 2:
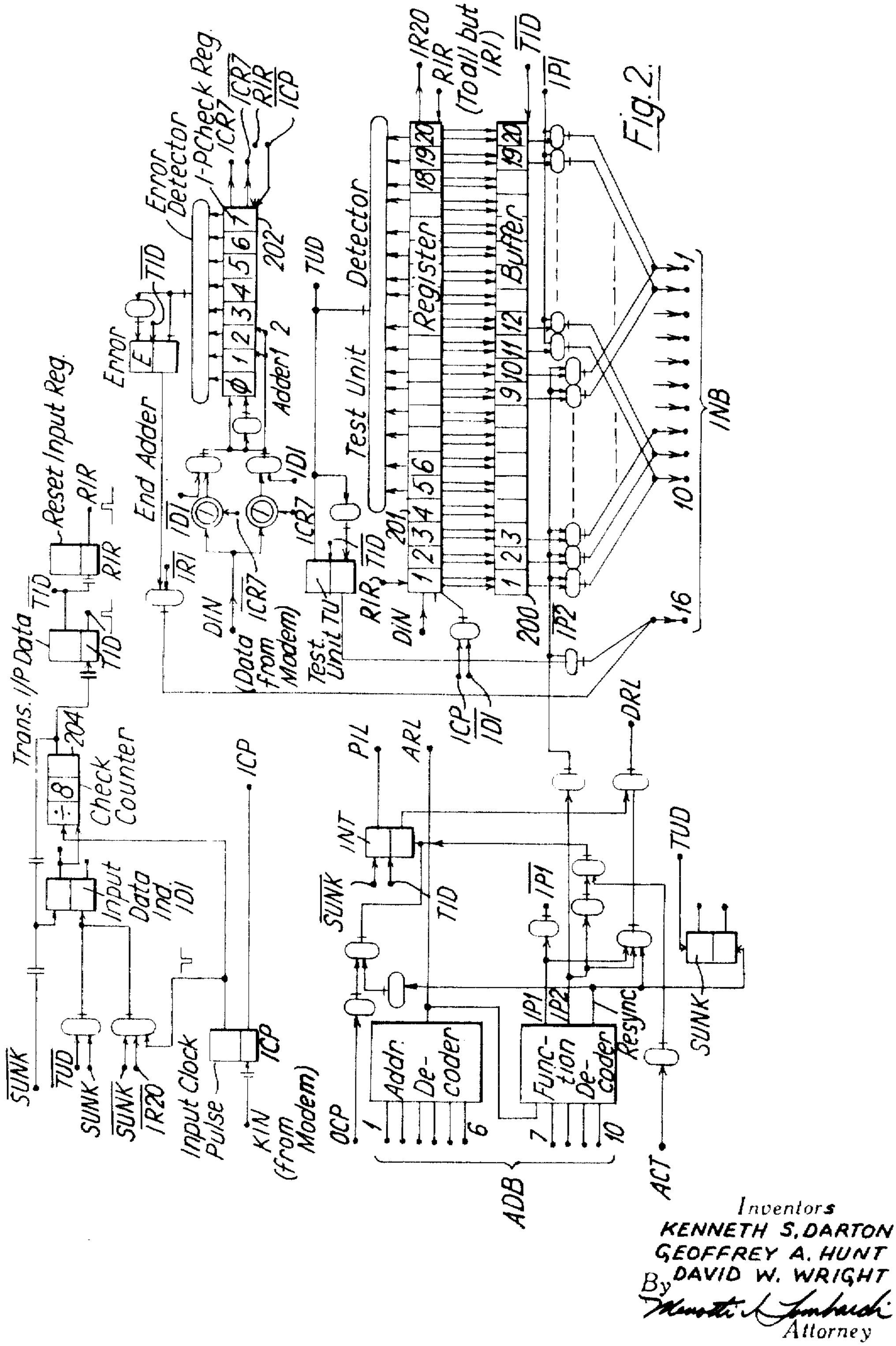
FIG. 2 illustrates the input from a data modem terminating a transmission line to a data processor, and FIG. 2$a$ shows a timing diagram having relevance to the arrangement of FIG. 2.
Figure 2A:
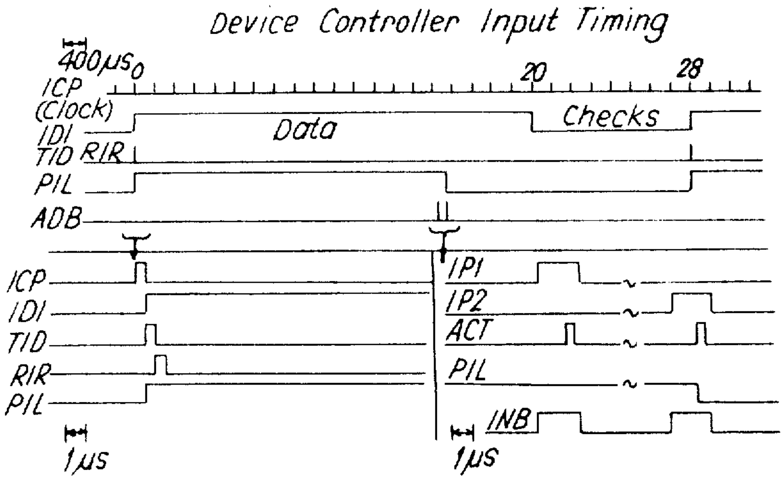

The input section, FIG. 2, besides assembling the DIN data into SU's, must be able to synchronize itself from the SYU. Like the output, it has a shift register 201 and a buffer 200. Data from the modem enters the register 201 serially, and is transferred in parallel to the buffer 200 when the register is full. In order to recognize a SYU, the outputs of all but the first four bistables of the shift register 201 are connected into a 16-input Nor gate TUD such that there is an output only when the register contains a correctly placed SYU. (The first four bits are the unit count). If the system has been set into a 'resync' mode, it will continue to shift in data until a SYU is recognized. It then goes over to normal operation. The processor can regain block synchronization from the unit count in the SYU. Normal DIN signals contain a high proportion of SYU's so no special procedure is necessary if only one terminal loses synchronization.

Error checking is performed by a re-entrant shift register 202 as in the output section. This forms checks for the message received. If the checks received are the same as the checks formed in 202 they will cancel out the checks so formed, leaving the check register empty at the end of the 28 (or 26 or 27) bits.

The first half-word transferred to the processor will contain 10 bits of data (bits 1 to 10) and bit 16 (the sign bit) will be 1 if an error is present. The second word will contain the other 10 bits, and bit 16 will be 1 if the data is a SYU. These can be checked very easily by a "skip if negative" instruction. No data processing is necessary in either case, just increment receive unit count, and record that that SU was correct or otherwise. It might be an improvement to put both indicator bits in the first word read, as if either are set, there is no need to read the second word. But bit 15 is not quite so quickly looked at as bit 16, and the input instruction only takes 2¼ cycles. This is a matter for the programmers, as it makes no difference to the complexity of the hardware.

As with the output section, the interrupt response must come within 11.7 mS.

For the input section, it has been found necessary to use a clock pulse ICP instead of the squarewave KIN, in order to prevent false triggering on the DIN transitions.

Assume that the 28th bit of a SU has just been clocked in. This will cause an output from the check counter 204, which will fire a transfer input data monostable TID and set the input data indicator IDI. The register 201 contains the 20 data bits, and TUD will be at 1 if the SU was a SYU. The check bits will have cancelled to 0 unless there was an error, in which case the error detector output will be 0. The TID pulse transfers these to their respective bistables, i.e., the buffer 200, the SYU bistable and the error bistable E. The interrupt (PIL) is also set.

The falling edge of the TID pulse fires the reset input register monostable RIR. This resets all but bit 1 of the register to 0. This bit is set to 1, and this is the marker for the input system.

The next 19 clock pulses shift data (from the modem) into the register. At the end of the 19th pulse, the marker appears in IR20. This opens the gate feeding the reset input of IDI. The next clock pulse therefore resets IDI as well as shifting in the 20th data bit to the register. The IDI signal stops further clock pulses to the register, and with the reset input to the check counter at 0, that proceeds to count clock pulses. The input to the check register 202 is also inverted, for the reasons mentioned previously when dealing with the output section. When the counter has counted in the 8 check bits, its output resets IDI and fires TID, and the process continues as before.

At some time within the 11.7 mS the interrupt must be serviced. First the IPI code is sent. This connects the output of the right-hand half of the buffer to the INB lines (10 bits), and also the Error signal (to bit 16). INB is energized for the length of the IPI (2 $\mu$S).

A little later the IP2 signal is sent by the processor. This connects the left hand half of the buffer to INB, and the SYU bistable to the bit 16 line.

The interrupt is reset by the ACT pulse associated with the IP2 signal. This means that the ACT also resets the DRL line. This is strobed before the ACT pulse can be set; if it is necessary for it to continue during the ACT pulse an additional monostable, (c/f the EDC in the output system), could be used.

If the data transmission circuit should lose synchronism at SU level, it must be regained by the device controller, (the modem will deal with bit synchronism). If the processor decided that synchronization has been lost, it will send a "resync" code to the device controller. This resets both the interrupt (PIL) and the bistable SUNK. The latter causes IDI to be set, and the IR20 input to the IDI reset to be inhibited. Thus data is continuously clocked into the register. When a SYU reaches the right position in the register, it is detected, and SUD goes to 1. This resets SUNK and IDI, which starts the check phase. At the end of this, TID fires, the register contents are transferred to the buffer, and PIL is set. From here on, the system works normally. The error bit will always be set for the first SYU, however, as the check register cannot be reset at the correct time, i.e., at the start of the signal unit, until one SU (i.e. the SYU) has already been received. Thus the check register tries to form checks for an indeterminate number of bits.

It can be seen that the check bits are not used for the first SYU found. This is not likely to cause trouble, as the chance of getting the SYU pattern from random bits is one in $2^{16}$ (65,000), and this rare error can be checked by ensuring that the next SU does have the correct check bits. This could be done in the device controller if necessary, but it probably is not.

Tests so far performed have shown that in the majority of cases where resynchronization is required, the line signal prior to recovery is not random, but continuous zeros (line break).

If several device controllers are connected to one processor, they will need to interrupt on different levels, or use a masking system. An alternative to this is not to use interrupts, but to interrogate the controllers at 10 mS intervals (say). There may well be real time programs running at this, or a faster rate, which could have a short section added. This method would also avoid interrupting fairly high level programs. If no data was ready, (or if the output section had not emptied its buffer), an I/O instruction or test would not produce a DRL signal. The I/O instruction skips the next instruction if successful, so detecting DRL by program is simple. If data were present, it could be stored to be dealt with by a lower level program. Possibly the initial process of checking for error or Test Unit could be performed at once, and the unit count incremented. The type of message could also be determined, as some messages have much higher priority than others.

Whether interrupts or interrogation is used depends on the arrangements of other programs and peripherals involved, rather than on the device controller hardware, as this is the same in either case.

It is to be understood that the foregoing description of specific examples of this invention is made by way of example only and is not to be considered as a limitation on its scope.

We claim:

1. A data processor interface for connecting a digital data processor utilizing data words of $n$-bits with a digital data transmission means in which data is transmitted in words of $m$-bits, where $m>n$ but $\leq 2n$, the $m$-bits which make up a transmission word include $k$ check bits, where $k \leq n$, the interface comprising in combination:

an output section including an $m$-bit transmitting register from which bits are transmitted to the transmission means in serial form, an $m$-bit transmitting buffer store and means coupled to enable transferring an $m$-bit data word in parallel to said transmitting register, a $k$-bit transmitting check register coupled for receiving the $m$-bits transmitted from said transmitting register and for forming in response thereto $k$ check bits, means coupling the output of the $k$-bit check register in the $m$-bit data word being serially transmitted from the $m$-bit transmitting register, means including a common set of connecting lines coupled to enable transfer in parallel two $n$-bit words sequentially to separate portions of the transmitting buffer store from the processor, and means coupled for inserting a test word in the transmitting buffer store in absence of a pair of $n$-bit data words for transmission from the processor; and an input section including an $m$-bit receiving register for receiving bits from the transmission means in serial form, an $m$-bit receiving buffer store coupled for receiving an $m$-bit data word which is transferred in parallel from said register, a $k$-bit receiving check register coupled for receiving check bits from the transmission means and for forming check bits, means coupled to the output of the $k$-bit receiving check register to indicate when the check bits formed are not the same as those received from the transmission means, means coupled to enable transferring in parallel two $n$-bit data words sequentially from the receiving buffer store to the processor for each $m$-bit word stored in the buffer store, and each pair of $n$-bit words having together $2n$-$m$ digit positions not occupied by data bits, gating means for coupling sequentially each of the two $n$-bit data words from a separate portion of the receiving buffer store to said processor, and means coupled to said register for detecting the presence of a test word entered serially in the register from said transmission means.

2. The interface according to claim 1 including means coupled for detecting a received synchronizing word, and means responsive to said synchronizing word for synchronizing the interface with the transmission means.

3. A data processor interface for connecting a digital data processor utilizing data words of 16 bits with a digital data transmission means in which data is transmitted in words of 20 bits plus $k$-check bits, the interface comprising in combination:

an output section including a 20-bit transmitting register from which bits are transmitted to the transmission means in serial form, a 20-bit transmitting buffer store and means coupled to enable transferring a 20-bit data word in parallel to said transmitting register, a *k*-bit transmitting check register coupled for forming a *k*-check bits in response to the data bits, means coupling the output of the *k*-bit check register in the 20-bit data word being serially transmitted from the 20-bit transmitting register, means including a common set of lines coupled to enable transfer in parallel two 10-bit data words sequentially to separate portions of the transmitting buffer store from the processor, and means coupled for inserting a test word in the transmitting buffer store in absence of a pair of 10-bit data words for transmission from the processor; and an input section including a 20-bit receiving register for receiving bits from the transmission means in serial form, a 20-bit receiving buffer store coupled for receiving a 20-bit data word which is transferred in parallel from said register, a *k*-bit receiving check register coupled for receiving check bits from the transmission means and for forming check bits, means coupled to the output of the *k*-bit receiving check register to indicate when the check bits formed are different from those received from the transmission means, means coupled to enable transferring in parallel two 10-bit data words sequentially from the receiving buffer store to the processor for each 20-bit word stored in the buffer store, gating means for coupling sequentially each of the two 10-bit data words from a separate portion of the receiving buffer store to said processor, and means coupled to said register for detecting the presence of a test word entered serially in the register from said transmission means; and said interface including means coupled for detecting a received synchronizing word, and means responsive to said synchronizing word for synchronizing the interface with the transmission means.

4. The interface of claim 3, wherein said data word is transmitted with 8 check bits.

* * * * *